United States Patent

Dory

[11] 4,005,258
[45] Jan. 25, 1977

[54] ULTRASONIC EXAMINATION
[75] Inventor: Jacques Dory, Meaux, France
[73] Assignee: Realization Ultrasoniques, France
[22] Filed: Nov. 26, 1974
[21] Appl. No.: 527,199
[30] Foreign Application Priority Data
Nov. 26, 1973 France .................. 73.42026
[52] U.S. Cl. .................. 358/112; 178/DIG. 18; 73/67.5 R; 343/17; 358/83
[51] Int. Cl.² .......................... H04N 7/18
[58] Field of Search .......... 178/DIG. 18, 6.8, 6; 340/5 H; 343/17, 6 TV; 73/67.5, 67.6, 67.7, 67.8, 69

[56] References Cited
UNITED STATES PATENTS

| 2,632,157 | 3/1953 | Jones | 343/6 |
| 3,763,693 | 10/1973 | Bhuta | 178/DIG. 18 |
| 3,772,457 | 11/1973 | Macovski | 178/DIG. 18 |
| 3,856,985 | 12/1974 | Yokoi | 178/DIG. 18 |

Primary Examiner—Roert L. Griffin
Assistant Examiner—Edward L. Coles
Attorney, Agent, or Firm—William Anthony Drucker

[57] ABSTRACT

A device for examination by ultrasonic pulses to produce better image resolution, of the type including the formation of a B-type intermediate image of the object examined on the target of a recording tube, the reading of this image by television type scanning, and its visualization on a television screen, in which there is a modulation of the television scanning, so that the beam exploring the intermediate image describes hyperbolic arcs identical with those which correspond, in the intermediate image, to each point of the object examined.

4 Claims, 7 Drawing Figures

ULTRASONIC EXAMINATION

The present invention relates to the examination of an object by a beam of waves emitted in pulses, with formation of an image, generally on the screen of a cathode ray tube.

Radar and ultrasonic echography are examples of such an examination.

In the following description, reference will be made more precisely by example, particularly interesting but not limitative, of the exploration of an image formed from pulses derived from ultrasonic echoes formed on the object.

In certain applications, in particular in the examination of biologic tissues by sonography and in various other types of medical or industrial testing, the quality of the image may need to be improved. The attempts made until now for this purpose have consisted, on the one hand, in using the shortest possible acoustic pulses, and on the other, in producing relatively narrow beams, for example by means of probes of the focusing type. These known solutions, however, do not provide a good resolution of the image for an examined region of great depth, or situated at a considerable distance from the probe.

The invention proposes to solve this problem by utilizing in a particular manner an intermediate image formed on a memory-endowed surface, preferably the target of a recording tube.

It is known how to form such an intermediate image, advantageously by the so-called process of "B type" representation, and then to utilize it by proceeding to read it by means of television type scanning, which is used at the same time to visualize the image thus read on a cathode screen.

It is clear that this process leads to the faithful reproduction of the intermediate image, without improvement of the resolution.

According to the invention, the intermediate image is utilized by means of a television type scan, so modulated that the scanning point describes a hyperbolic arc moving along each horizontal scanning line while remaining similar to itself, the parameters of the hyperbola varying from one scanning line to the next.

The invention applies a mathematical transformation which will be referred to as "spatial deconvolution", and which will now be explained.

As will be shown below, when an image is formed by using a certain mode of representation (B type, for example), there corresponds to each object point a portion of image curve (hyperbolic arc in the case of the B type representation). The applicant has discovered that in scanning such an image along curves substantially identical to the image curves, and in visualizing the read out signals thus obtained, the final image will correspond at each object point to a small spot more or less comparable to a point, according to the fineness of the electron beam and the shortness of the ultrasonic pulses used to form the intermediate image. It is this transformation that has been termed spatial deconvolution.

The result is a considerable improvement in the resolution of the final image.

The invention will be better understood with the aid of the following description:

Figure 1:
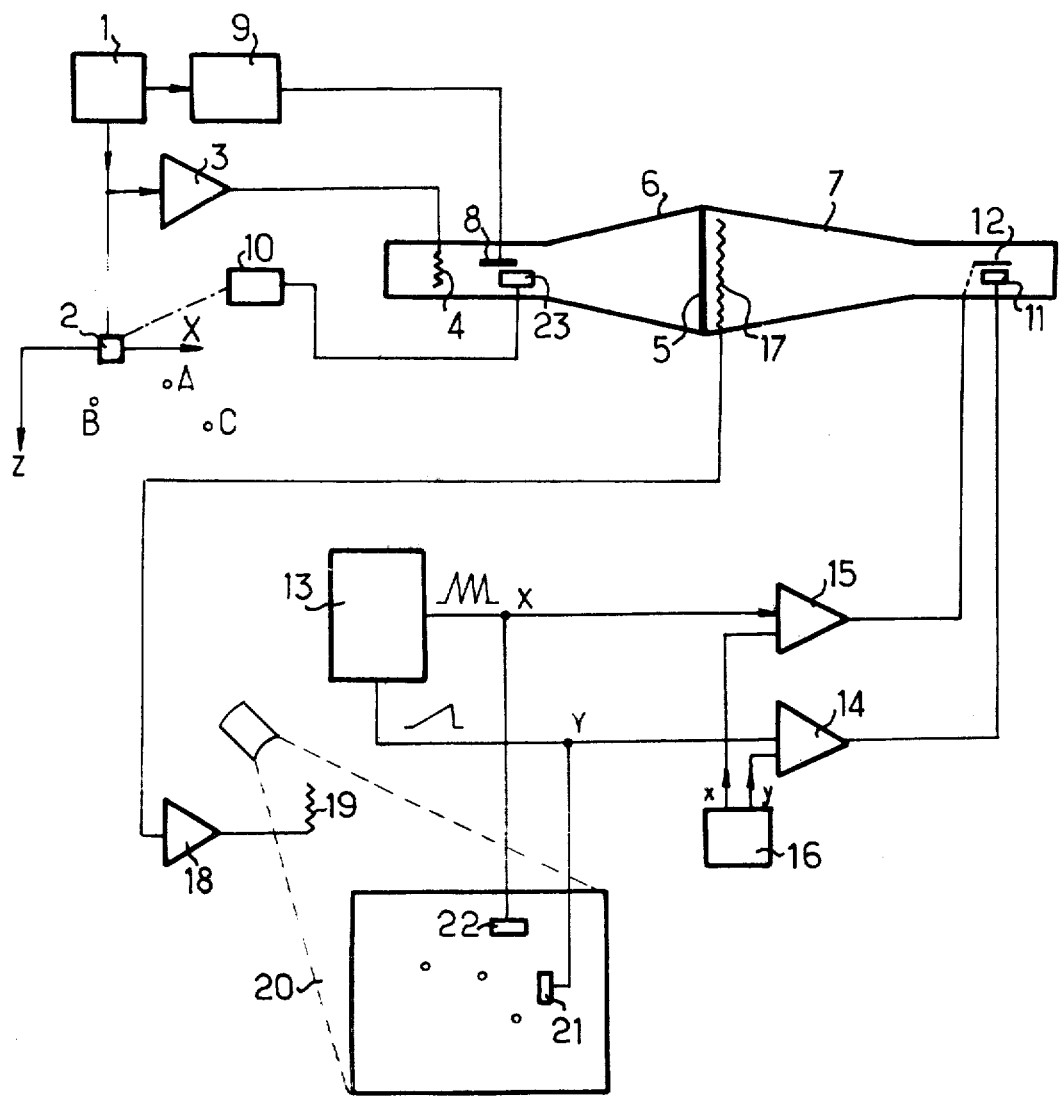
FIG. 1 is a basic diagram of a device for examination by ultrasound with B type exploration, according to a preferred embodiment of the invention.

The device in FIG. 1 comprises an electric pulse transmitter 1 which energizes a transmitting-receiving probe 2 subjected, by means not shown, to a displacement along an axis OX, over the surface of the object to be examined, of which three points, A, B, C are shown, situated in the vertical plane XOZ.

The device is designed for the probe to transmit very short ultrasonic pulses, at a repetition rate sufficient for the displacement of the probe, between two successive transmissions, to be small in relation to the wavelength.

The echoes resulting from the reflection of these pulses in the object are received by a known device, symbolized by an amplifier 3, and applied to the spot modulating electrode 4 of a two-gun recording tube. The latter comprises, on either side of a semi-transparent memory target 5, two guns 6 and 7, of which one (6) serves to write an image on the target, and the other (7) serves to read this image.

The writing is effected by the classic process known as "B type" analysis: The vertical scanning of the spot is controlled at 8 by a generator 9 synchronized with the transmitter 1, while the horizontal scanning is controlled at 23 by a generator 10 synchronized with the displacement of the probe (this synchronization is symbolized in the drawing by a dash-dot line).

Figure 2:
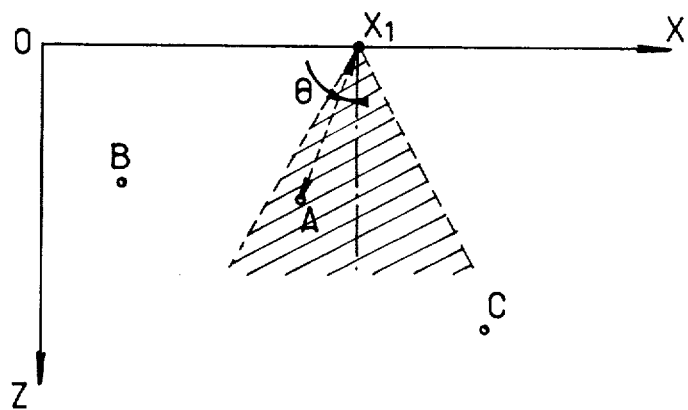
FIGS. 2 and 3 show respectively three object points and the corresponding image curves.
Figure 3:
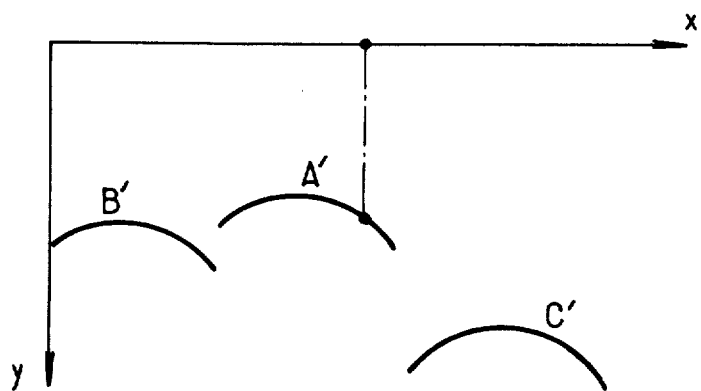

FIG. 2 shows the plane XOZ containing the three object points A, B, C. If we consider the position $x_1$ of the probe such that the ultrasonic beam which it transmits, shown with hatchings and having a half-angle at the apex , reaches the point A situated at a distance $r$ from point $x_1$, we have: $r^2 = z^2 + (x_1 - x)^2$, $x$ and $z$ being the coordinates of point A. When the probe moves, so that the radiated beam reaches A, a point is written on the target 5 for each value of $x_1$. Let $x$ and $y$ be the coordinates of this image point (FIG. 3). It is clear that $x$ is proportional to $x_1$, while $y$ is proportional to $r$. If we suppose, to simplify, that the scale chosen is equal to 1, we have $$y^2 = z^2 + (x - x)^2 \qquad (1)$$

For a given point A, X and Z being constants, the image is therefore a hyperbolic arc (A', FIG. 3), limited by the angle of aperture 2ϕ of the beam.

A known process consists in analysing the image by a "television" type scan, and visualizing the read out signal thus obtained on a classic television receiver. The image written on the target of the two-gun tube is therefore reproduced without alteration.

In the practice, this known technique gives images of mediocre resolution, since for each point of the object there is a corresponding hyperbolic arc on the image. It is known that the resolution of the image becomes better as the beam radiated by the probe is narrower and the pulses are shorter. Now, while it is known how to produce very short pulses, at the wavelengths used for the examination the classic piezoelectric probes do not furnish sufficiently narrow beams. The probes of the focused type provide narrow beams of only a small length, which limits their utility.

In the device described, instead of faithfully reproducing on the screen of a television receiver the image of the target, a point on said screen corresponds to each hyperbolic arc of the image of the target.

For this purpose, the $x$ and $y$ deflection electrodes 11 and 12 of the read out beam of gun 7 receive, on the one hand, a classic scan control along a "television" raster (scanning generator 13 and summing amplifiers 14 and 15), on the other hand, superposed on this classic control, a higher frequency modulation furnished by a function generator 16. Generator 16 is arranged so that the modulation function is such that the read out spot describes a hyperbolic arc moving along each horizontal scanning line Ox while remaining similar to itself, the distance between the foci of the hyperbola varying from one scanning line to the next, as a function of the ordinate Oy.

Figure 4:
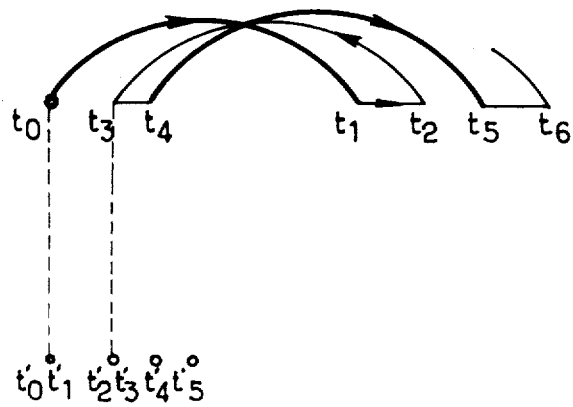
FIG. 4 represents the reading scan of the intermediate image.

The parameters of this hyperbola are defined by the above equation (1). More precisely, the path of the read out spot is as represented in FIG. 4. A first hyperbolic arc is scanned between the instants $t_0$ and $t_1$ and, after a phase angle $t_1 t_2$, a second $t_2 t_3$ is scanned in reverse; then, after a phase angle $t_3 t_4$, a third arc $t_4 t_5$ is scanned in the forward direction, and so forth.

Figure 5:
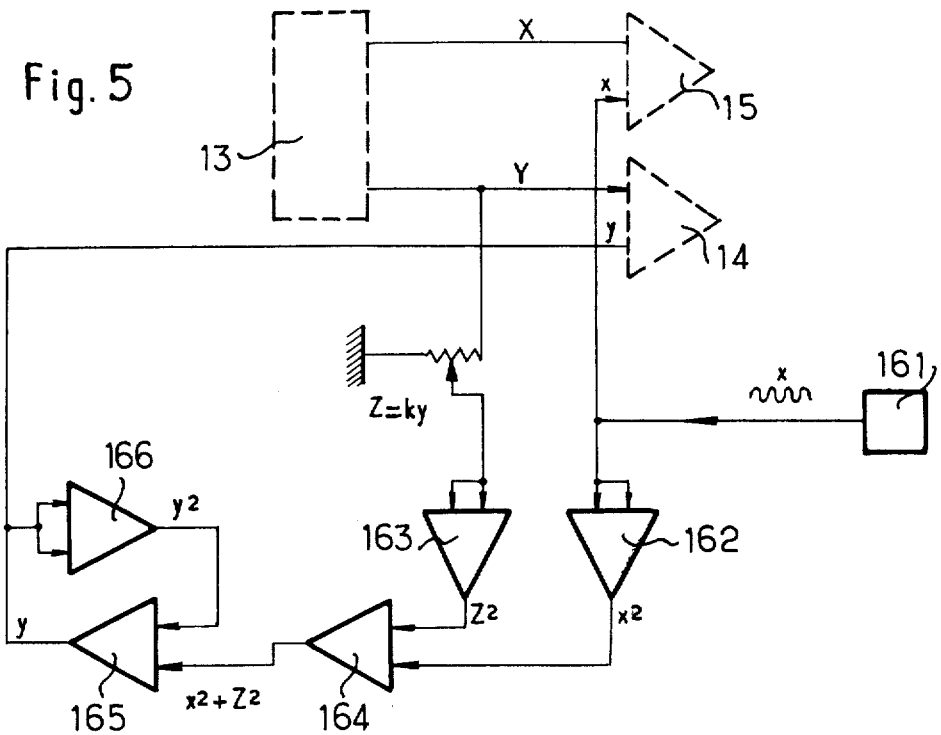
FIG. 5 represents a detail of the circuits of the device of FIG. 2.

Such a function generator is illustrated in FIG. 5.

The voltage $x$ is, in the example described, a sinusoidal oscillation of high frequency furnished by a generator 161. It is applied, on one hand, to one of the inputs of amplifier 15; and on the other hand, to the two inputs of an analog multiplier 162. The latter furnishes on its output terminal a voltage proportion to $x \cdot x = x^2$.

A voltage $z = ky$ proportional to the $y$ scanning voltage is applied at the input of another analog multiplier 163, which furnishes at its output a voltage $z^2$. An amplifier 164 forms the sum $x^2 + z^2$, which is applied at an input of a high gain differential amplifier 165. The other input of the latter amplifier 165 is connected to the output of an analog multiplier 166, the two inputs of which are connected to the output of amplifier 165.

The interval between the input voltages of amplifier 165 is at a substantially zero value, so that its output voltage assumes the value $y$ = square root of $(x^2 + z^2)$. This voltage is applied to one input of amplifier 14.

Coming back to FIG. 1, the signal for reading target 5 with the beam of gun 7, picked up by electrode 17 and amplified at 18, is applied to the modulation electrode 19 of the spot of tube 20 of a television receiver, whose $z$ and $y$ deflection control electrodes 21–22 are connected to the scanning generator 13.

Under these conditions, for each hyperbolic arc A', B', C' written on target 5 there corresponds on the screen of tube 20 a small spot whose dimensions become smaller as the hyperbolic arc corresponding to each object point (A, B or C) is finer and longer, that is, as the probing pulse is shorter and the probe less directional. In FIG. 4 are shown at $t'_0 t'_1$, $t'_2 t'_3$, $t'_4 t'_5$, the spots corresponding to the scanning arcs $t_0 t_1, t_2 t_3, t_4 t_5$.

A small directional probe can be obtained by using a small-size piezoelectric element. Unfortunately, the sensitivity of such an element is slight, so that the practical applications are limited.

A preferred variant consists in using a focusing probe and narrowing the radiated beam at the level of the focal spot, to eliminate the secondary lobes.

The device described offers the advantage of giving, almost instantly, an image of high quality from a recording itself made very rapidly from a single acoustic scan.

Several variants of execution are possible, without going outside the spirit of the invention. It goes without saying, in particular, that the recording tube could have a single gun, provided writing means and reading means permitting two different types of scanning are provided. It might be envisaged to use a representation of the intermediate image according to a different mode from the B type mode.

Figure 6:
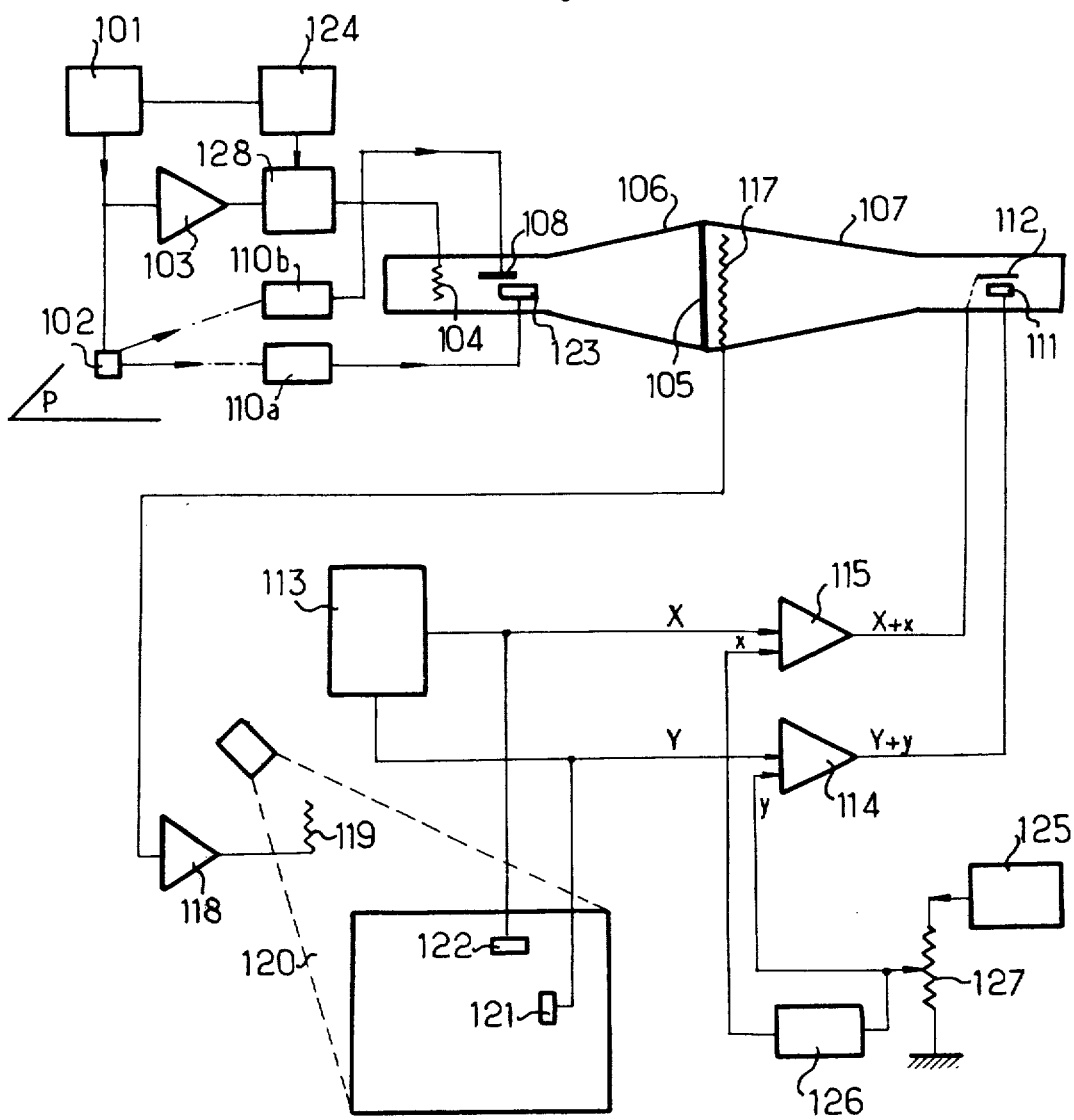
FIG. 6 represents a variant with C type exploration.

For example, to use a C type scan, the probe is moved in known manner over the object to be examined carrying out a line-by-line scanning in a plane P parallel to the surface of the object (FIG. 6).

The recording is done by imparting to the writing spot of the two-gun tube a movement homothetic to that of the probe, and modulating the writing intensity by the amplitude of the echoes received.

In the diagram of FIG. 6 the same essential members appear as in FIG. 1, namely: transmitter 101, probe 102, receiving appllfier 103, two-gun tube 106–107 with its writing target 105 and its reading electrode 117, amplifier 118, television receiver tube 120 with its modulation electrode 119 and its X and Y deflection control electrodes 121–122, scan generator 113, summing amplifiers 114–115 which actuate respectively the deflection electrodes 111 and 112 of the reading gun 107.

The movement of probe 102 in plane P is controlled by two driving members symbolized in the drawing by two axes X and Y. One member 110a generates, in known manner, synchronization signals of the horizontal deflection of the beam of gun 106, which are applied to the electrode 123, while a member 110b generates synchronization signals of the vertical deflection of the beam of gun 106, which are applied to the electrode 108. Thus a homothetic writing scan of the movement of the probe is obtained.

For each pulse transmitted, the probe receives numerous reflected pulses corresponding to obstacles situated at variable distances and arriving shifted in time.

To separate these different echoes, one uses an electronic device 128 connected between the receiving amplifier 103 and the modulation electrode 104 of the spot of gun 106 which lets pass only the voltage corresponding to pulses having traveled a certain "return trip" path, comprised between $t_1$ and $t_1 + \Delta t$, that is corresponding to obstacles situated, in relation to plane P, between the distances $r_1$ and $r_1 + \Delta r$, such as $r_1 = t_1/2c$, $c$ being the speed of propagation of the ultrasounds in the probed medium.

$r_1$ is chosen equal to the largest examination distance.

Device 128 is an open gate whose opening is controlled by a circuit 125. Circuit 125 comprises for example a delay member followed by a monostable flip-flop. The delay member transmits the transmission pulse to the flip-flop with a predetermined adjustable delay equal to $2c\, r_1$. The flip-flop is then set during a short internal of time $\Delta t$, during which the opening of the gate is controlled.

Figure 7:
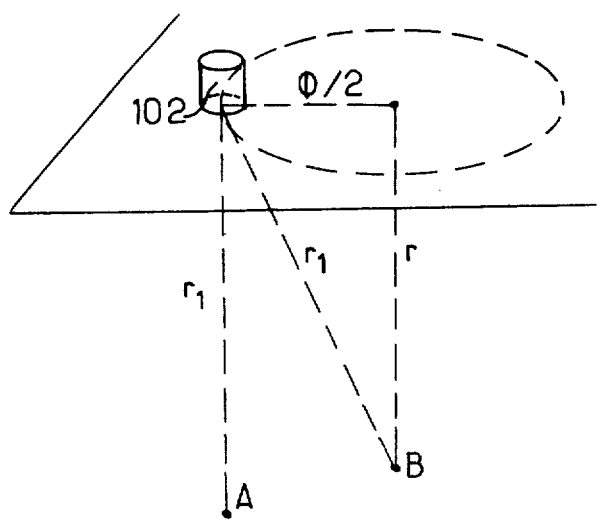
FIG. 7 illustrates the operation of the device of FIG. 6.

In these conditions, FIG. 7 makes it plain that the "object" points such as A situated at the distance $r_1$ will be written in the form of a point.

On the other hand, the object points such as B, situated at distances $r$ less than $r_1$, give rise to "image" circles of a diameter $\phi = 2\sqrt{r_1^2 - r^2}$.

The image obtained on target 105 will therefore be formed by a plurality of circles of different diameters; to each diameter there corresponds a distance.

The reading is done in a manner analogous to that already described for the B type scan, but imparting to the reading electron beam an auxiliar movement of circular form.

For this purpose, a 10 MHz oscillator 126 furnishes an auxiliary sinusoidal voltage $x$ at an input of amplifier 115 and an auxiliary sinusoidal voltage $y$ at an input of amplifier 114. VOLTAGE $x$ is phase shifted by 90° in relation to voltage $y$ by means of a phase shifter 126. A potentiometer 127 permits adjusting the amplitude of the voltages $x$ and $y$, with the effect of modifying the focusing distance of the image on the receiver tube 120.

In fact, for a given diameter of the auxiliary circular movement, the restored image will be that of all points of a plane situated at the distance alpha $= \sqrt{r_1^2 - \phi/4^2}$ of the plane scanned by the probe.

It is possible, therefore by varying the diameter by adjustment of potentiometer 127, to "focus" on planes situated at a distance from the probe less than $r_1$ and thus to obtain successive "sections" of the object.

The minimum probing distance is, in this case, limited by the aperture angle $\theta$ of the ultrasonic probing beam.

The application of the process described for examination by ultra-sound is not limiting; a radar with synthetic aperture could, for example, be constructed according to the same principle of spatial deconvolution.

The term "memory-endowed surface" may be taken in a very general sense. It may involve, for example, as in the application described, a memory of the analog type consisting of the screen of a special cathode ray tube, in which the image is memorized in the form of electric charges deposited by an electron beam on an insulating substrate. But it may also be a memory of electronic type consisting of an assembly of discrete elements addressable by logic circuits. In the latter case, the exploration corresponding to each point of the intermediate image is quantified simultaneously in position and in intensity. The exploitation of this image then also occurs in numerical form, by successively reading the data stored at different points of the memory situated on curves corresponding to the hyperbolic arcs.

The electronic circuits are more complex, but the precision of the device can be better than with an analog memory if a sufficient number of elements is used.

What is claimed is:

1. In a device for examination of an object by ultrasonic pulses, said device including a transmitter of recurrent electric pulses, a transmitting-receiving ultrasonic transducer energized by this transmitter and subjected to a linear displacement, a receiver of reflected pulses coupled to said transducer, a recording tube coupled to said receiver and having a memory target, a writing electron beam with an horizontal and a vertical scan and a reading electron beam, means for synchronizing said horizontal scan with the displacement of the transducer and for synchronizing the said vertical scan with the repetition rate of the transmitted pulses, a television scan generator supplying scan signals which control the scanning of the memory target by the reading electron beam, and a display tube controlled by said scan generator and modulated by the reading signal supplied by the recording tube, the improvement which consists in that the said device further comprises a function generator supplying further scan signals and means coupled to said function generator for modulating the scanning of the memory target by the reading electron beam by means of the said further scan signals, thereby to move the reading electron beam along successive curve portions arranged on a plurality of horizontal scanning lines.

2. A device according to claim 1, in which said transducer is of small size and slightly directional.

3. In a process for examination of an object comprising: scanning said object by a beam of waves emitted in short pulses and moved over the object, receiving the pulses reflected by said object, forming on a memory endowed surface an intermediate image wherein each scanned point of the object is represented by an image curve portion, scanning said intermediate image by an electron beam, whereby forming reading signals, and displaying said reading signals, whereby forming a final image on a display screen, the improvement which consists in that the intermediate image is scanned by the electron beam along successive curve portions which are substantially identical to said image curve portion, whereby each point of the object is displayed as a point in the final image.

4. The object examination process improvement according to claim 3, in which the said process comprising scanning of the object and forming of the intermediate image by using the B type of scanning, the intermediate image is scanned by an electron beam moved along successive hyperbolic arcs arranged along a plurality of horizontal scanning lines, the respective hyperbolic arcs on each horizontal scanning line being identical with each other while the parameters of the hyperbolic arcs vary from one horizontal scanning line to the next; and the display of the reading signals comprises modulating a television picture forming electron beam by said reading signals, and scanning the display screen by the modulated beam in synchronism with the scanning of the intermediate image.

* * * * *